United States Patent
Schreer et al.

(10) Patent No.: US 9,158,994 B2
(45) Date of Patent: Oct. 13, 2015

(54) APPARATUS AND METHOD FOR REAL-TIME CAPABLE DISPARITY ESTIMATION FOR VIRTUAL VIEW RENDERING SUITABLE FOR MULTI-THREADED EXECUTION

(71) Applicant: Fraunhofer-Gesellschaft zur Foerderung der angewandten Forschung e.V., Munich (DE)

(72) Inventors: Oliver Schreer, Berlin (DE); Frederik Zilly, Berlin (DE); Peter Kauff, Berlin (DE); Christian Riechert, Berlin (DE); Marcus Mueller, Berlin (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 0 days.

(21) Appl. No.: 14/271,480

(22) Filed: May 7, 2014

(65) Prior Publication Data
US 2014/0241637 A1 Aug. 28, 2014

Related U.S. Application Data

(63) Continuation of application No. PCT/EP2012/071845, filed on Nov. 5, 2012.

(60) Provisional application No. 61/559,808, filed on Nov. 15, 2011.

(51) Int. Cl.
G06K 9/62 (2006.01)
H04N 13/00 (2006.01)
G06K 9/00 (2006.01)

(52) U.S. Cl.
CPC .......... *G06K 9/6202* (2013.01); *G06K 9/00201* (2013.01); *H04N 13/0007* (2013.01); *H04N 13/0022* (2013.01)

(58) Field of Classification Search
CPC .................. G06K 9/6202; G06K 9/00201
USPC ...................................... 382/218; 348/51, 43
See application file for complete search history.

(56) References Cited

U.S. PATENT DOCUMENTS

| 2010/0194856 A1* | 8/2010 | Varekamp ........................ 348/42 |
| 2011/0032341 A1* | 2/2011 | Ignatov et al. .................. 348/51 |
| 2014/0176539 A1* | 6/2014 | Tsubaki et al. ............... 345/419 |

OTHER PUBLICATIONS

Official Communication issued in International Patent Application No. PCT/EP2012/071845, mailed on Feb. 15, 2013.
(Continued)

*Primary Examiner* — Ruiping Li
(74) *Attorney, Agent, or Firm* — Keating & Bennett, LLP

(57) ABSTRACT

An apparatus for estimating a disparity map based on at least two images is provided. The apparatus includes at least two processing units, which include a pixel recursion unit configured to determine a disparity value as a pixel recursion disparity candidate based on a plurality of pixel values of the at least two images and a selector configured to select a selected disparity candidate to determine at least one of the disparity map values of the disparity map. The selector is adapted to select the selected disparity candidate from a candidate group assigned to the selector. The candidate group assigned to the selector includes the pixel recursion disparity candidate, a second disparity candidate and a third disparity candidate. Moreover, the selector is adapted to select the selected disparity candidate independently from a different selector of a different processing unit of the at least two processing units.

27 Claims, 12 Drawing Sheets

(56) References Cited

OTHER PUBLICATIONS

Official Communication issued in International Patent Application No. PCT/EP2012/071845, mailed on Nov. 7, 2013.
Atzpadin et al., "Stereo Analysis by Hybrid Recursive Matching for Real-Time Immersive Video Conferencing", IEEE Transactions on Circuits and Systems for Video Technology, vol. 14, No. 3, Mar. 1, 2004, pp. 321-334.
Chen et al., "An Efficient Parallel Motion Estimation Algorithm for Digital Image Processing", IEEE Transactions on Circuits and Systems for Video Technology, vol. 1, No. 4, Dec. 1, 1991, pp. 378-385.
Zhu et al., "A New Diamond Search Algorithm for Fast Block-Matching Motion Estimation", IEEE Transactions on Image Processing, vol. 9, No. 2, Feb. 1, 2000, pp. 287-290.
Swamy et al., "Architecture for motion estimation using the one-dimensional hierarchical search block-matching algorithm", IEE Proceedings E. Computers & Digital Techniques, Institution of Electrical Engineers, vol. 149, No. 5, Sep. 27, 2002, pp. 229-239.

* cited by examiner

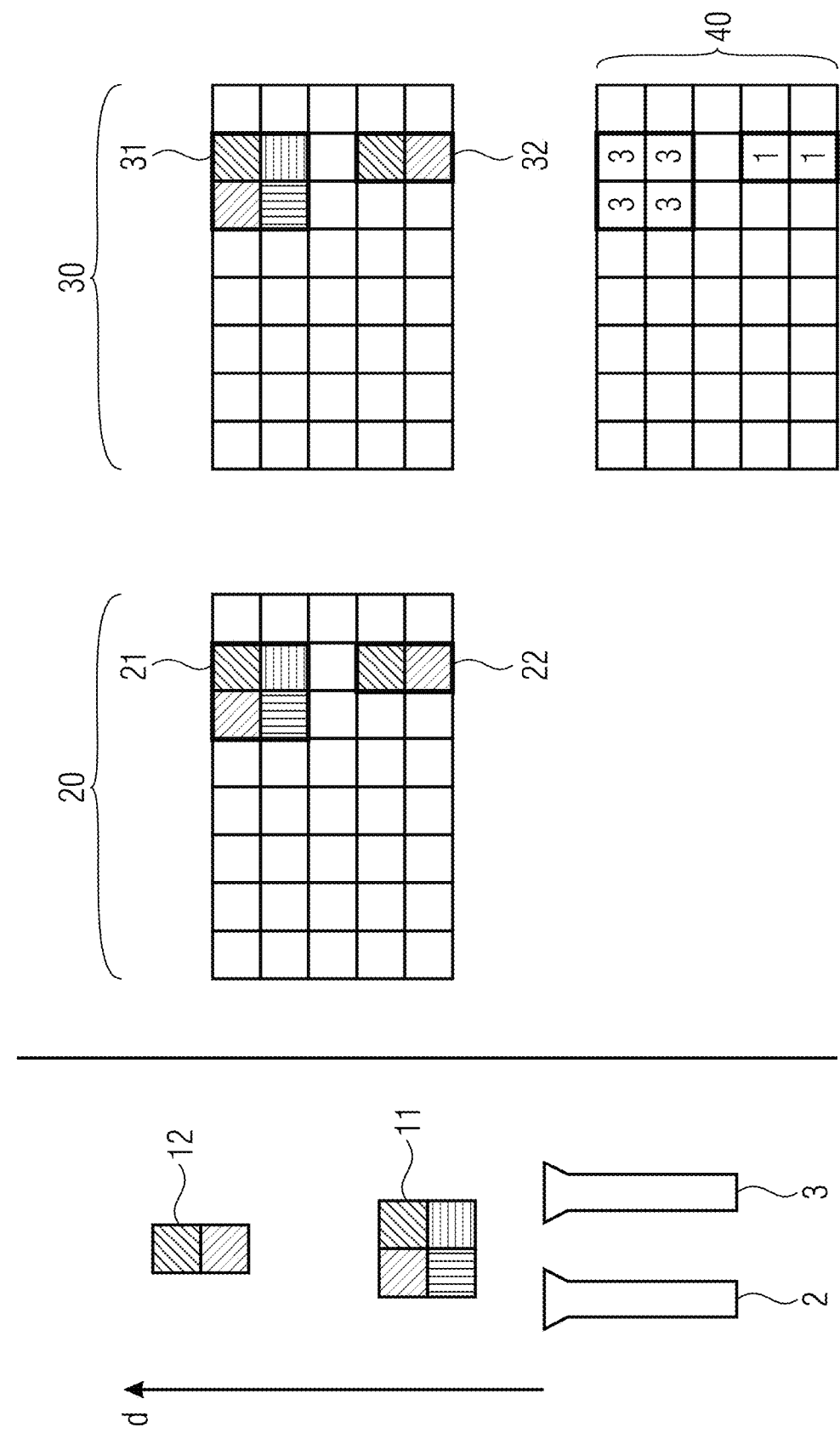

APPARATUS AND METHOD FOR REAL-TIME CAPABLE DISPARITY ESTIMATION FOR VIRTUAL VIEW RENDERING SUITABLE FOR MULTI-THREADED EXECUTION

CROSS-REFERENCE TO RELATED APPLICATIONS

This application is a continuation of copending International Application No. PCT/EP2012/071845, filed Nov. 5, 2012, which is incorporated herein by reference in its entirety, and additionally claims priority from U.S. Application No. 61/559,808, filed Nov. 15, 2011, which is also incorporated herein by reference in its entirety.

BACKGROUND OF THE INVENTION

The present invention relates to video processing, and, in particular, an apparatus and a method for real-time capable disparity estimation for virtual view rendering suitable for multi-threaded execution.

Video applications and the processing of video data becomes more and more important. In this context, the role of 3D videos increases. The next generation of 3D displays will be autostereoscopic. In contrast to conventional glasses-based displays, which have two views, autostereoscopic displays have an arbitrary number of views. With the advent of multi-view autostereoscopic displays, an apparatus and a method for generating an arbitrary number of views from stereoscopic content would be of great importance. Since most current and future content will only be available with two views, the missing views have to be calculated from the available ones. A well-known way to create virtual views is Depth Image Based Rendering (DIBR). Depth Image Based Rendering can generate these views from stereoscopic images and corresponding disparity maps.

Disparity maps will now be explained with reference to FIG. 13. On the left side of FIG. 13, two cameras 2, 3 are illustrated. The cameras are directed towards two objects 11, 12. The first object 11 is arranged close to the cameras 2, 3. The second object 12 is further away from the cameras 2, 3. Both cameras now create an image of the scene. The first (left) camera 2 creates image 20. The second (right) camera 3 creates image 30, as illustrated on the right side of FIG. 13. It should be noted that in video applications, a plurality of subsequent images are recorded by the cameras employed.

On the right side of FIG. 13, image 20 and image 30 illustrate the same scene from different perspectives, namely, image 20 illustrates the scene from the perspective of the left camera 2, while image 30 illustrates the scene from the perspective of the right camera 3. By this, the objects 11, 12 appear at different positions in the images 20, 30. In particular, the first object 11 is illustrated as object 21 in image 20 and as object 31 in image 30, while the second object 12 appears as object 22 in image 20 and as object 32 in image 30. As can be seen, the position of object 21 in image 20 differs more from the position of object 31 in image 30, than the position of object 22 in image 20 differs from the position of object 32 in image 30. This results from the fact that object 11 is located closer to the cameras 2, 3 than object 12, which is further away from the cameras 2, 3.

A corresponding disparity map 40 is illustrated in FIG. 13 below images 20 and 30. Portion 41 of the disparity map 40 indicates by how many positions the object 21 in FIG. 13 has to be shifted, to be at a position corresponding to the position of object 31 in image 30. The disparity map 40 indicates that all four pixels of the object 21 have to be shifted by three pixels, such that object 21 is shifted to the position of object 31. This is indicated by the four pixel disparity values in portion 41 n the disparity map 40. It should be noted, that in reality, a real image normally comprises much more pixels than the images 20 and 30, and, as a consequence, pixel disparity values may be much greater.

Portion 42 of the disparity map 40 indicates by how many positions the object 22 in FIG. 13 has to be shifted, to be at a position corresponding to the position of object 32 in image 30. The two pixel disparity values in the portion 42 of the disparity map 40 indicate that the two pixels of the object 22 have to be shifted by one pixel, such that object 22 is shifted to the position of object 32.

The disparity map 40 in FIG. 13 illustrates by how many pixels the corresponding pixel has to be shifted in a horizontal directions. Other disparity maps may also indicate that a pixel of a first image has to be shifted by a certain number of pixels in a vertical direction to be at a position of a corresponding pixel in a second image.

Depth Image Based Rendering needs disparity maps to render virtual views. To estimate these disparity maps in real-time at the consumer site, a fast and reliable disparity estimator has to be available which is also suitable to be implemented in hardware like Field-Programmable Gate Arrays (FPGAs) or Application-Specific Integrated Circuits (ASICs).

The state of the art provides a hybrid recursive matcher (HRM) described in:

Atzpadin, N., Kauff, P., Schreer, O. (2004): *Stereo Analysis by Hybrid Recursive Matching for Real-Time Immersive Video Conferencing. IEEE Trans. on Circuits and Systems for Video Technology, Special Issue on Immersive Telecommunications, Vol.* 14, *No.* 4, 321-334.

The hybrid recursive matcher (HRM) described in Atzpadin, N., Kauff, P., Schreer, O. (2004) utilizes the original concept of recursive block matching for motion compensation explained in:

De Haan, G., Biezen, P. W. A. C., Huijgen, H., Ojo, O. A. (1993): *True-Motion Estimation with* 3-*D Recursive Search Block Matching. IEEE Trans. on Circuits and Systems for Video Technology, Vol.* 3*, No.* 5, 368-379.

Furthermore, the hybrid recursive matcher (HRM) of Atzpadin, N., Kauff, P., Schreer, O. (2004) utilizes the extension of De Haan, G., Biezen, P. W. A. C., Huijgen, H., Ojo, O. A. (1993) towards hybrid recursive matching proposed by:

Kauff, P., Schreer, O., Ohm, J.-R. (2001): *An Universal Algorithm for Real-Time Estimation of Dense Displacement Vector Fields. Proc. of Int. Conf. on Media Futures, Florence, May* 2011, which is protected for disparity estimation since 2002, see:

Atzpadin, N., Karl, M., Kauff, P., Schreer, O. (2002), European Patent Application, Publication Number: EP 1 229 741 A2.

According to the state of the art presented in Atzpadin, N., Kauff, P., Schreer, O. (2004), it is proposed to determine disparity values of pixels by conducting a block recursion. This state of the art proposes to determine the disparity values of the pixels of an image by employing a special meander-like recursive structure, wherein a meander scan is conducted on images of arbitrarily shaped video objects. According to this teaching, for each pixel on the meander path, the previous disparity value on the meander scan path has to be calculated before, as it is needed to determine the disparity value of the actual pixel on the meander scan path. By this, the disparity values of the pixels have to be determined one after the other in subsequent order along the meander scan path.

The HRM presented in Atzpadin, N., Kauff, P., Schreer, O. (2004) has already been used in real-time for image sizes up to SD (Standard Definition) resolution. However, e.g., HD (High Definition) resolution necessitates fast processing, and it would therefore be highly desirable that an apparatus and method with the ability to create disparity maps in short time would be available.

SUMMARY

According to an embodiment, an apparatus for determining a disparity map including a plurality of disparity map values, based on at least two images, may have: at least two processing units, wherein each of the at least two processing units includes: a pixel recursion unit for determining a disparity value as a pixel recursion disparity candidate based on a plurality of pixel values of the at least two images, and a selector, configured to select a selected disparity candidate to determine at least one of the disparity map values of the disparity map, wherein the selector is adapted to select the selected disparity candidate from a candidate group assigned to the selector, wherein the candidate group assigned to the selector includes the pixel recursion disparity candidate, a second disparity candidate and a third disparity candidate, and wherein the selector is adapted to select the selected disparity candidate independently from a different selector of a different processing unit of the at least two processing units.

According to another embodiment, an apparatus for generating a post-processed disparity map may have: a first inventive apparatus for estimating a disparity map including a plurality of disparity map values, based on at least two images, for providing a first disparity map, a second inventive apparatus for estimating a disparity map including a plurality of disparity map values, based on the at least two images, for providing a second disparity map, a comparator for comparing the first disparity map and the second disparity map, and for identifying invalid disparity pixels, being located at the same pixel position in the first and the second disparity map and having different disparity values or disparity values with a difference greater than a predefined threshold value, and a map generator for generating a resulting disparity map including resulting map values, wherein the map generator is configured to generate the resulting disparity map from the first and the second disparity map, by generating for a pixel position of the resulting disparity map a resulting map value based on at least a pixel at the pixel position in the first or the second disparity map, when the pixel at the pixel position has not been identified as invalid disparity pixel by the comparator.

According to another embodiment, a method for estimating a disparity map including a plurality of disparity map values, based on at least two images, may have the steps of: determining a first disparity value as a first pixel recursion disparity candidate based on a first plurality of pixel values of the least two images, selecting a first selected disparity candidate to determine at least one of the disparity map values of the disparity map, wherein the selected disparity candidate is selected from a first candidate group including the first pixel recursion disparity candidate and at least two further disparity candidates, determining a second disparity value as a second pixel recursion disparity candidate based on a second plurality of pixel values of the least two images, and selecting a second selected disparity candidate to determine at least one of the disparity map values of the disparity map, wherein the second selected disparity candidate is selected from a second candidate group including the second pixel recursion disparity candidate and at least two further disparity candidates, wherein the first selected disparity candidate is selected independently from the selection of the second selected disparity candidate, and wherein the second selected disparity candidate is selected independently from the selection of the first selected disparity candidate.

According to another embodiment, a method for estimating a disparity map including a plurality of disparity map values, based on at least two images, may have the steps of: determining a first disparity value as a first pixel recursion disparity candidate based on a first plurality of pixel values of the least two images, selecting a first selected disparity candidate to determine at least one of the disparity map values of the disparity map, wherein the selected disparity candidate is selected from a first candidate group including the first pixel recursion disparity candidate and at least two further disparity candidates, determining a second disparity value as a second pixel recursion disparity candidate based on a second plurality of pixel values of the least two images, and selecting a second selected disparity candidate to determine at least one of the disparity map values of the disparity map, wherein the second selected disparity candidate is selected from a second candidate group including the second pixel recursion disparity candidate and at least two further disparity candidates, wherein the first selected disparity candidate is selected independently from the selection of the second selected disparity candidate, and wherein the second selected disparity candidate is selected independently from the selection of the first selected disparity candidate.

Another embodiment may have a computer program for implementing an inventive method, when the computer program is executed by a computer or processor.

An apparatus for determining a disparity map comprising a plurality of disparity map values, based on at least two images is provided. The apparatus comprises at least two processing units. Each of the at least two processing units comprises a pixel recursion unit and a selector. The pixel recursion unit is configured to determine a disparity value as a pixel recursion disparity candidate based on a plurality of pixel values of the at least two images. The selector is configured to select a selected disparity candidate to determine at least one of the disparity map values of the disparity map. The selector is adapted to select the selected disparity candidate from a candidate group assigned to the selector. The candidate group assigned to the selector comprises the pixel recursion disparity candidate, a second disparity candidate and a third disparity candidate. Moreover, the selector is adapted to select the selected disparity candidate independently from a different selector of a different processing unit of the at least two processing units.

According to an embodiment, the candidate group assigned to the selector of the processing unit does not comprise a disparity candidate provided by a selector of a different processing unit of the at least two processing units.

In a further embodiment, a first selector of a first processing unit of the at least two processing units is configured to select a first selected disparity candidate in parallel to a different second selector selecting a different second disparity candidate, wherein the different second selector is a selector of a different second processing unit of the at least two processing units.

An apparatus is proposed, which allows to generate disparity maps in real-time. The proposed concepts, provided apparatuses and provided methods are suitable for parallelization and thus for implementation on FGPAs and ASICs. By employing the concepts of the present invention, high quality disparity maps for DIBR can be provided.

The conventional hybrid recursive matcher presented in Atzpadin, Kauff & Schreer, 2004, supports a dedicated single processor hardware. However, it cannot take advantage of multi-core environments for high-definition applications due to its special meander-like recursive structure, which prevents parallelization by design. To allow parallel processing, the conventional meander recursion is be broken up, in order to process higher image resolutions in real-time by using modern multi-core environments, e.g. using parallelization. Consequently, the hybrid recursive matcher according to embodiments, in particular, the line-wise and column-wise recursive matcher presented below, breaks the conventional meander recursion allowing for a parallel execution of lines and columns. By allowing parallel execution, this enables the disparity estimation to be implemented in hardware like FPGA or ASIC, for which a certain degree of a parallelization is indispensable.

Below, two variants of a real-time capable disparity estimator will be presented: The line-wise hybrid recursive matcher (L-HRM), where each line and column can be processed in parallel and the temporal hybrid recursive matcher (T-HRM), wherein each single pixel can be processed in parallel.

According to an embodiment, the pixel recursion unit of each of the at least two processing units is adapted to determine the pixel recursion disparity candidate by subsequently determining a plurality of disparity update values. At least one of the plurality of disparity update values may be determined based on an intensity difference between a pixel of a first image and a pixel of a second image of the at least two images. Furthermore, the pixel recursion unit may be adapted to determine at least one of the plurality of disparity update values based on an intensity difference between a first pixel of the first image and a different second pixel of the first image.

In an embodiment, the pixel recursion unit of each of the at least two processing units is adapted to determine at least one of the plurality of pixel disparity update values by applying the formulae:

$$d_{n+1}(x, y) = d_n - \Delta I(x, y, d_n) \cdot \delta, \text{ and}$$

$$\Delta I(x, y, d_n) = I_L(x, y) - I_R(x + d_n, y), \text{ and}$$

$$\text{wherein } \delta = \frac{I_L(x+1, y) - I_L(x, y)}{\|I_L(x+1, y) - I_L(x, y)\|^2} \text{ or } \delta = \frac{1}{I_L(x+1, y) - I_L(x, y)},$$

and
wherein $d_n$ is a disparity value, wherein $I_L(x,y)$ is a first intensity value of pixel (x,y) of a first image, wherein $I_R(x+d_n,y)$ is a second intensity value of pixel $(x+d_n,y)$ of a second image, and wherein $I_L(x+1,y)$ is a third intensity value of pixel (x+1,y) of the first image.

In another embodiment, the pixel recursion unit of each of the at least two processing units is adapted to determine the pixel recursion disparity candidate by subsequently determining a plurality of disparity update values, wherein the pixel recursion unit of each of the at least two processing units is adapted to generate the plurality of disparity update values by determining one or more random numbers and by employing the one or more random numbers for generating the plurality of disparity update values.

According to an embodiment, the pixel recursion unit of at least one of the at least two processing units may comprise a first pixel recursion subunit and a second pixel recursion subunit. The first pixel recursion subunit may determine a first group of disparity update values of the plurality of disparity update values by conducting a first plurality of iteration steps. The second pixel recursion subunit may determine a second group of different disparity update values of the plurality of disparity update values by conducting a second different group of iteration steps. The first pixel recursion subunit may furthermore determine the first group of disparity update values in parallel to the second pixel recursion subunit determining the second group of different disparity update values.

According to another embodiment, the pixel recursion unit of each of the at least two processing units may be configured to conduct for each of the plurality of disparity update values a block comparison of a first block of pixel intensity values of the first image with a second block of pixel intensity values of the second image by employing a quality measure, to determine the pixel recursion disparity candidate.

The first pixel recursion unit of a first processing unit of the at least two processing units may be configured to determine a first pixel recursion disparity candidate in parallel to a different second pixel recursion unit determining a different second pixel recursion disparity candidate. The different second pixel recursion unit may be a pixel recursion unit of a different second processing unit of the at least two processing units.

According to an embodiment, the selector of each of the at least two processing units may be adapted to select a selected disparity candidate from the candidate group assigned to the selector, wherein the candidate group assigned to the selector comprises the pixel recursion disparity candidate, a disparity of a horizontally or vertically preceding pixel and a disparity of a pixel of a previous frame. Furthermore, the selector of each of the at least two processing units may be adapted to select a selected disparity candidate for each pixel of at least one line of the disparity map.

According to a further embodiment, a first selector of a first processing unit of the at least two processing units may be configured to determine a first selected disparity candidate in parallel to a different second selector determining a different second selected disparity candidate, wherein the different second selector is a selector of a different second processing unit of the at least two processing units.

In an embodiment, the selector of each of the at least two processing units may be configured to conduct, for the pixel recursion disparity candidate, for the disparity of the horizontally or vertically preceding pixel and for the disparity of a pixel of the previous frame, block comparisons of a first block of pixel intensity values of the first image with a second block of pixel intensity values of the second image, by employing a quality measure, to determine the pixel recursion disparity candidate.

In another embodiment, each processing unit may furthermore comprise a secondary chooser, wherein each secondary chooser is configured to choose at least one of the disparity map values of the disparity map from a secondary group of at least two values, the secondary group comprising one of the selected disparity candidates selected by the selectors of the at least two processing units as a first value and a vertically or horizontally preceding pixel's disparity as a second value.

Each secondary chooser of the processing units may, according to an embodiment, be adapted to determine the pixel disparity value for all pixels of at least one column of the disparity map. In another embodiment, each secondary chooser of the processing units may be adapted to determine the pixel disparity value for all pixels of at least one line of the disparity map.

In a further embodiment, a first secondary chooser of a first processing unit of the at least two processing units may be configured to determine a first disparity map value in parallel to a different second secondary chooser determining a different second selected disparity map value, wherein the different second secondary chooser may be a secondary chooser of a different second processing unit of the at least two processing units.

The selector of each of the at least two processing units may, according to an embodiment, be configured to conduct block comparisons of a first block of pixel intensity values of the first image with a second block of pixel intensity values of the second image, by employing a quality measure, to determine the pixel recursion disparity candidate.

A line-wise and column-wise hybrid recursive matcher (L-HRM) is provided. The L-HRM comprises two essential parts: the line- and column-wise recursion of the pixel recursion. The pixel recursion step introduces new disparity candidates to the estimator and is essential for the initialization of the disparity estimation and scenes with fast changing content. The line- and column-wise recursion propagates disparities of surrounding pixels and previous frames to the current pixel. This ensures spatial and temporal stability of the resulting disparity maps.

In the line-wise hybrid recursive matcher (L-HRM) each line and column can be processed in parallel.

According to another embodiment, the selector of each of the at least two processing units may be adapted to select a selected disparity candidate from the candidate group assigned to the selector, wherein the candidate group assigned to the selector comprises the pixel recursion disparity candidate and disparities of at least four previous pixels of the previous frame. The at least four previous pixels of the previous frame may be arranged as a cross in the previous frame. Alternatively, the at least four previous pixels of the previous frame may be arranged as a star in the previous frame.

In a further embodiment, a first selector of a first processing unit of the at least two processing units may be configured to determine a first selected disparity candidate in parallel to a different second selector determining a different second selected disparity candidate. The different second selector may be a selector of a different second processing unit of the at least two processing units.

According to another embodiment, the selector of each of the at least two processing units is configured to conduct block comparisons of a first block of pixel intensity values of the first image with a second block of pixel intensity values of the second image, by employing a quality measure, to determine the pixel recursion disparity candidate.

In the temporal hybrid recursive matcher (T-HRM), each single pixel can be processed in parallel.

According to an embodiment, an apparatus for generating a post-processed disparity map is provided. The apparatus for generating a post-processed disparity map may comprise: a first apparatus for estimating a disparity map comprising a plurality of disparity map values, based on at least two images, according to one of the above-described embodiments for providing a first disparity map; a second apparatus for estimating a disparity map comprising a plurality of disparity map values, based on the at least two images, according to one of the above-described embodiments for providing a second disparity map. The apparatus for generating a post-processed disparity map may furthermore comprise a comparator for comparing the first disparity map and the second disparity map, and for identifying invalid disparity pixels, being located at the same pixel position in the first and the second disparity map and having different disparity values or disparity values with a difference greater than a predefined threshold value. Moreover, the apparatus for generating a post-processed disparity map may furthermore comprise a map generator for generating a resulting disparity map comprising resulting map values. The map generator may be configured to generate the resulting disparity map from the first and the second disparity map, by generating for a pixel position of the resulting disparity map a resulting map value based on at least a pixel at the pixel position in the first or the second disparity map, when the pixel at the pixel position has not been identified as invalid disparity pixel by the comparator.

In a further embodiment the map generator may be configured to generate a mean value of a plurality of resulting map values of the resulting disparity map and to use the generated mean value as a resulting disparity map value for a pixel at a position in the resulting disparity map that has been identified as an invalid disparity pixel by the comparator.

BRIEF DESCRIPTION OF THE DRAWINGS

Embodiments of the present invention will be detailed subsequently referring to the appended drawings, in which:

FIG. 13 depicts a camera setup of two cameras, two images recorded by the cameras and a disparity map corresponding to the two images.

DETAILED DESCRIPTION OF THE INVENTION

Figure 1:
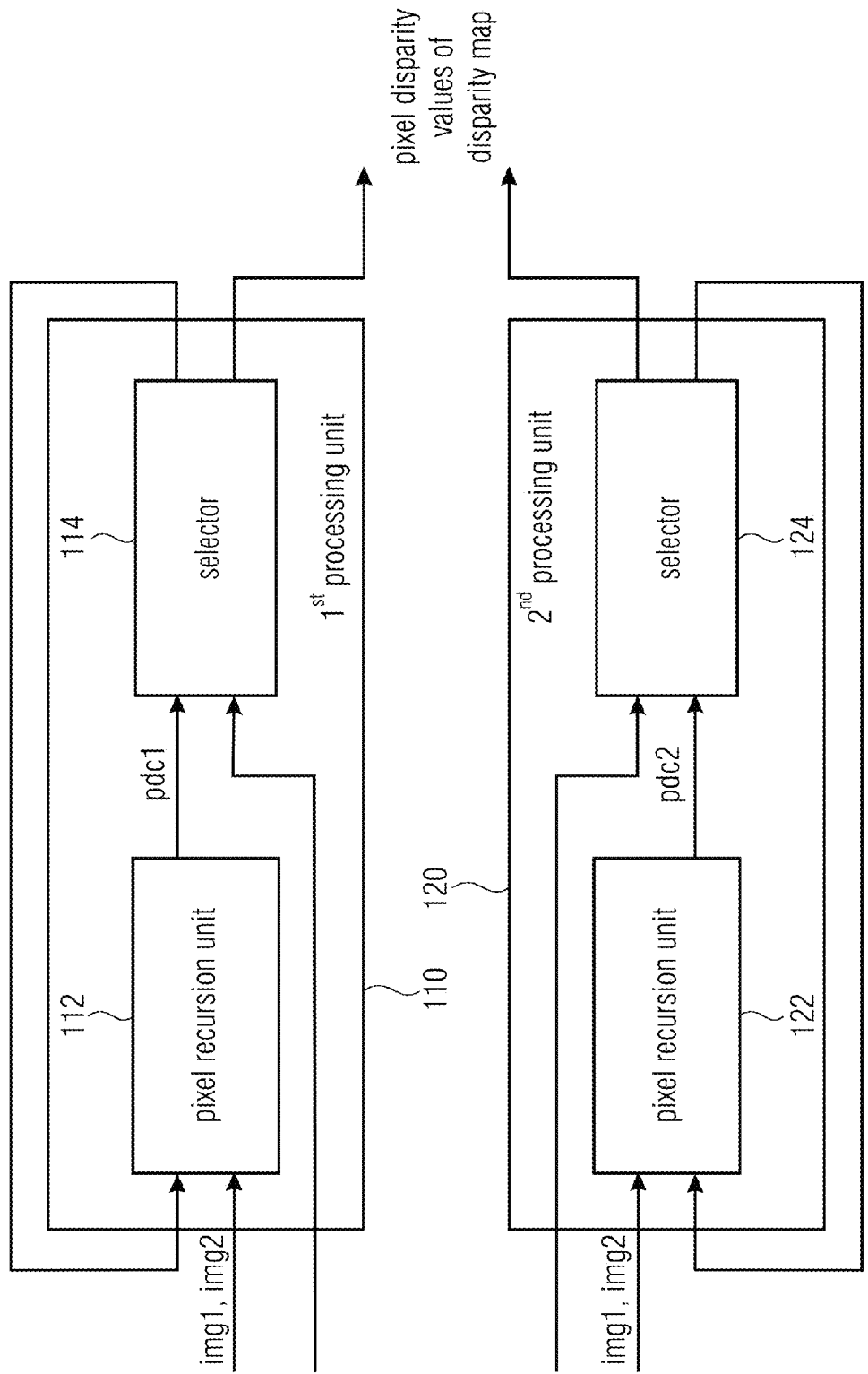
FIG. 1 illustrates an apparatus for determining a disparity map comprising a plurality of pixel disparity values according to an embodiment.

FIG. 1 illustrates an apparatus for determining a disparity map comprising a plurality of disparity map values, based on at least two images according to an embodiment. The apparatus comprises two processing units, a first processing unit 110 and a second processing unit 120. The first processing unit comprises a pixel recursion unit 112 and a selector 114. Likewise, the second processing unit 120 comprises a pixel recursion unit 122 and a selector 124.

The pixel recursion unit 112 of the first processing unit 110 is configured to determine a disparity value as a pixel recursion disparity candidate pdc1 based on a plurality of pixel values of the at least two images img1, img2. The selector 114 of the first processing unit 110 is configured to select a selected disparity candidate to determine at least one of the disparity map values of the disparity map. The selector 114 is adapted to select the selected disparity candidate from a candidate group assigned to the selector 114. The candidate group assigned to the selector comprises the pixel recursion disparity candidate pdc1, a second disparity candidate and a third disparity candidate.

Likewise, the pixel recursion unit 122 of the second processing unit 120 is configured to determine a disparity value as a pixel recursion disparity candidate pdc2 based on a plurality of pixel values of the at least two images img1, img2. The selector 124 of the second processing unit 120 is configured to select a selected disparity candidate to determine at least one of the disparity map values of the disparity map. The selector 124 is adapted to select the selected disparity candidate from a candidate group assigned to the selector 124. The candidate group assigned to the selector comprises the pixel recursion disparity candidate pdc2, a second disparity candidate and a third disparity candidate.

The selector 114 of the first processing unit 110 is adapted to select the selected disparity candidate independently from the selector 124 of the second processing group 120. Likewise, the selector 124 of the second processing unit 120 is adapted to select the selected disparity candidate independently from the selector 114 of the first processing group 110.

According to an embodiment, the candidate group assigned to the selector 114 of the first processing unit 110 does not comprise a disparity candidate provided by the selector 124 of the second processing unit 120. Additionally, in an embodiment, the candidate group assigned to the selector 124 of the second processing unit 120 does not comprise a disparity candidate provided by the selector 114 of the second processing unit 100

In a further embodiment, the selector 114 of the first processing unit 110 may be configured to select a first selected disparity candidate in parallel to the second selector 124 of the second processing unit 120, the second selector selecting a different second disparity candidate.

The selector 114 of the first processing unit 110 may be adapted to select only some of the selected disparity candidates that are necessitated to determine the pixel disparity values of the disparity map, while the selector 124 of the second processing unit 120 selects the other selected disparity candidates necessitated to determine the pixel disparity values of the disparity map, that have not been selected by the selector 114 of the first processing unit 110. By this, the work to be done is divided between the selector 114 of the first processing unit 110 and the selector 124 of the second processing unit 120. Thus, parallelization becomes possible, e.g. two processors may be employed to allow parallel execution, and so, the computation of the disparity map is accelerated. This, however, is only possible, if the selector 114 of the first processing unit 110 can select its selected disparity values independently of the selection of the selector 124 of the second processing unit 120 and vice versa. By this, the selector 114 of the first processing unit 110 does not have to wait on the selector 124 of the second processing unit 120, and so that the selector 124 of the second processing unit 120 does not have to wait on the selector 114 of the first processing unit 110, and the overall processing time can be reduced significantly.

In the following, a line-wise hybrid recursive matcher (L-HRM) is provided. The L-HRM comprises two essential paths: the line- and column-wise recursion and the pixel recursion. The pixel recursions step introduces new disparity candidates to the estimator and scenes with fast changing content. Line- and column-wise recursion propagates disparities of surrounding pixels and previous frames to the current pixel.

In the following, pixel recursion is explained in more detail. The pixel recursion of the L-HRM is highly similar to the pixel recursion of the HRM as presented in Atzpadin, Kauff & Schreer, 2004. The aim of the pixel recursion is to determine a pixel disparity candidate regarding a currently examined pixel. In order to find a reliable disparity estimate, the neighborhood of the current pixel is examined. The pixel recursion calculates a plurality of disparity update values from which the pixel disparity candidate is selected by the pixel recursion unit.

The pixel recursion needs an initial disparity at the start of the pixel recursion. With respect to video applications, a video stream comprises a plurality of subsequent images, for example, a plurality of subsequent image pairs, which may be comprised in a plurality of image frames. A plurality of subsequent disparity maps may be calculated for the plurality of image pairs. A suitable initial disparity estimate for the pixel recursion may be the disparity of the same pixel in the previous disparity map. Another suitable initial disparity estimate would be a pixel disparity value that has been previously calculated for the current disparity map, e.g., a horizontally preceding pixel disparity. In another embodiment, the pixel recursion unit is adapted to select either the disparity of the same pixel in the previous frame or the horizontally preceding pixel disparity as initial disparity estimate. In a further embodiment, the initial disparity estimate may be set to a default value. For example, the initial disparity estimate may be set to a default value, if neither the horizontally preceding pixel disparity nor the disparity of the same pixel in the previous frame is available.

We can now assume, that an initial disparity estimate for the pixel recursion is available. One or more disparity update values are then calculated following the principles of optical flow. A disparity update value is calculated on the basis of the spatial gradients and gradients between a left (first) and right (second) input image as shown in equation (1):

$$d_{n+1}(x, y) = d_n - \Delta I(x, y, d_n) \cdot \frac{\vec{\nabla} I_L(x, y)}{\left\| \vec{\nabla} I_L(x, y) \right\|^2} \quad (1)$$

The gradient between the left and the right image is approximated by the intensity difference of corresponding pixels as calculated by the current disparity estimate according to equation (2):

$$\Delta I(x,y,d_n) = I_L(x,y) - I_R(x+d_n,y) \quad (2)$$

Since vertical disparities are of no concern to the L-HRM, the spatial gradient reduces to a simple derivation in x-direction. The derivation in turn is approximated by a simple intensity difference of neighboring pixels as shown in equa tion (3). In case of a gradient equal to zero, the disparity is left unchanged:

$$\frac{\vec{\nabla} I_L(x, y)}{\|\vec{\nabla} I_L(x, y)\|^2} \approx \frac{I_L(x+1, y) - I_L(x, y)}{\|I_L(x+1, y) - I_L(x, y)\|^2} = \frac{1}{I_L(x+1, y) - I_L(x, y)} \qquad (3)$$

In other words, $d_n$ represents the previous disparity value that is used to obtain the disparity update value. An intensity value $I_L(x,y)$ of a considered pixel (x,y) in a first (left) image is regarded. Moreover, the corresponding pixel in the second (right) image is considered. If the previously considered disparity value $d_n$ would be correct, the corresponding pixel in the second (right) image would be the pixel $(x+d_n, y)$ and its intensity value $I_R(x+d_n, y)$ would be equal to the intensity value $I_L(x,y)$ of the pixel (x,y) in the first image, i.e. $\Delta I(x,y, d_n)=I_L(x,y)-I_R(x+d_n,y)$ would be zero.

If, however, $\Delta I(x,y,d_n)=I_L(x,y)-I_R(x+d_n,y)$ is not zero, the disparity update value has to be modified. In this case, formula $I_L(x+1, y)-I_L(x,y)$ is employed, which indicates for the first picture by how much the intensity of pixel (x+1, y) differs from the intensity of pixel (x,y).

Figure 2:
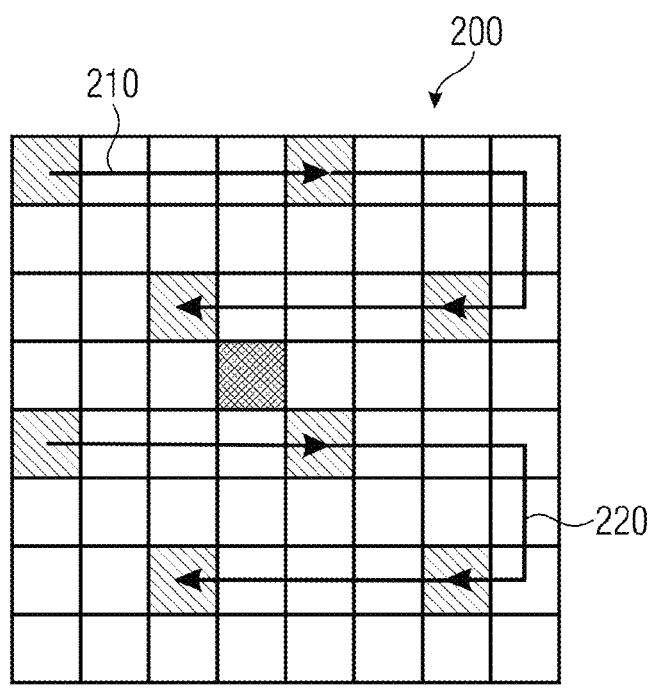
FIG. 2 depicts an example iteration pattern of the line-wise hybrid recursive matcher's pixel recursion according to an embodiment.

FIG. 2 illustrates an example iteration pattern of the L-HRM's pixel recursion (dark grey: current pixel; light grey: pixels visited during iteration). As with optical flow, the disparity is updated iteratively. For each iteration step, a different position in the neighborhood is chosen. FIG. 2 shows the pattern of visited pixels for an 8×8 block 200. Two independent iteration patterns 210, 220 exist in this case, each having four steps. This scheme can be applied to a neighborhood of arbitrary size. The disparity update value with the smallest absolute intensity difference between corresponding pixels in the left and right image is chosen as new pixel recursion disparity candidate for the line-wise respectively column-wise recursion described below.

As this scheme of pixel recursion comprises two independent iterations 210, 220, the two independent iterations are suitable for parallelization. For example, the two independent iterations may be conducted by two different processors, and thus, the processing time reduces approximately by 50%. Other iteration patterns may be used as well. For example, a 16×16 neighborhood pattern may be employed comprising four independent iterations. Either, the four independent iterations may be conducted by two different processors, by which the processing time reduces by 50% compared to the processing of a single processor. However, four different processors may be employed for four independent iterations, which reduces the processing time by approximately 75%.

Figure 3:
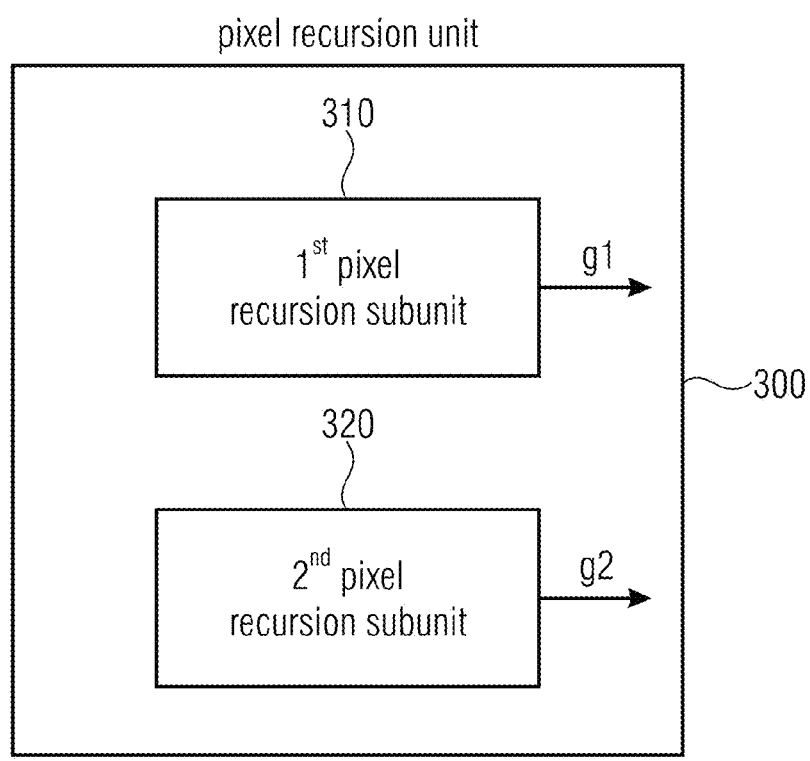
FIG. 3 illustrates a pixel recursion unit according to an embodiment comprising a first and a second pixel recursion subunit.

FIG. 3 illustrates the pixel recursion unit 300 of a processing unit. For example, the first processing unit 110 and the second processing unit 120 illustrated in FIG. 1 may comprise the pixel recursion unit 300 of FIG. 3 in an embodiment. The pixel recursion unit 300 comprises a first pixel recursion subunit 310 and a second pixel recursion subunit 320. The first pixel recursion subunit 310 may determine a first group g1 of disparity update values of the plurality of disparity update values by conducting a first plurality of iteration steps. The second pixel recursion subunit 320 may determine a second group g2 of different disparity update values of the plurality of disparity update values by conducting a second different group of iteration steps. The first pixel recursion subunit 310 may furthermore determine the first group g1 of disparity update values in parallel to the second pixel recursion subunit 320 determining the second group g2 of different disparity update values.

In an alternative embodiment, the disparity update values may be generated by determining one or more random numbers $r_n$ and by employing the one or more random numbers $r_n$ for generating the plurality of disparity update values. The disparity update values may, for example, be determined by employing the formula $d_{n+1}(x,y)=d_n-r_n$, wherein $r_n$ may, for example, be a random number, for example randomly chosen from a suitable predefined range, for example from the range [−10; 10], [−5.5; 7.5], [−50; 50], [−25; 45], or any other suitable range. An individual random number may, for example, be randomly determined for each disparity update value that shall be determined.

In the following, line-wise and column-wise recursion is explained. For the line-wise, respectively column-wise recursion, the disparity candidate from the pixel recursion is compared to a further candidate from previously calculated pixels in the neighborhood and the previous frame. This is done using block comparisons of the current pixel's neighborhood with the corresponding region in the second (stereo) image. As a quality measure, the normalized cross-correlation is used, though other measures like the sum of absolute differences (SAD) or the sum of squared differences (SSD) would also be possible. A block size of 8×8 pixels produces the best overall results, but other block sizes like 4×4 or 16×16 pixels are also feasible.

Figure 4:
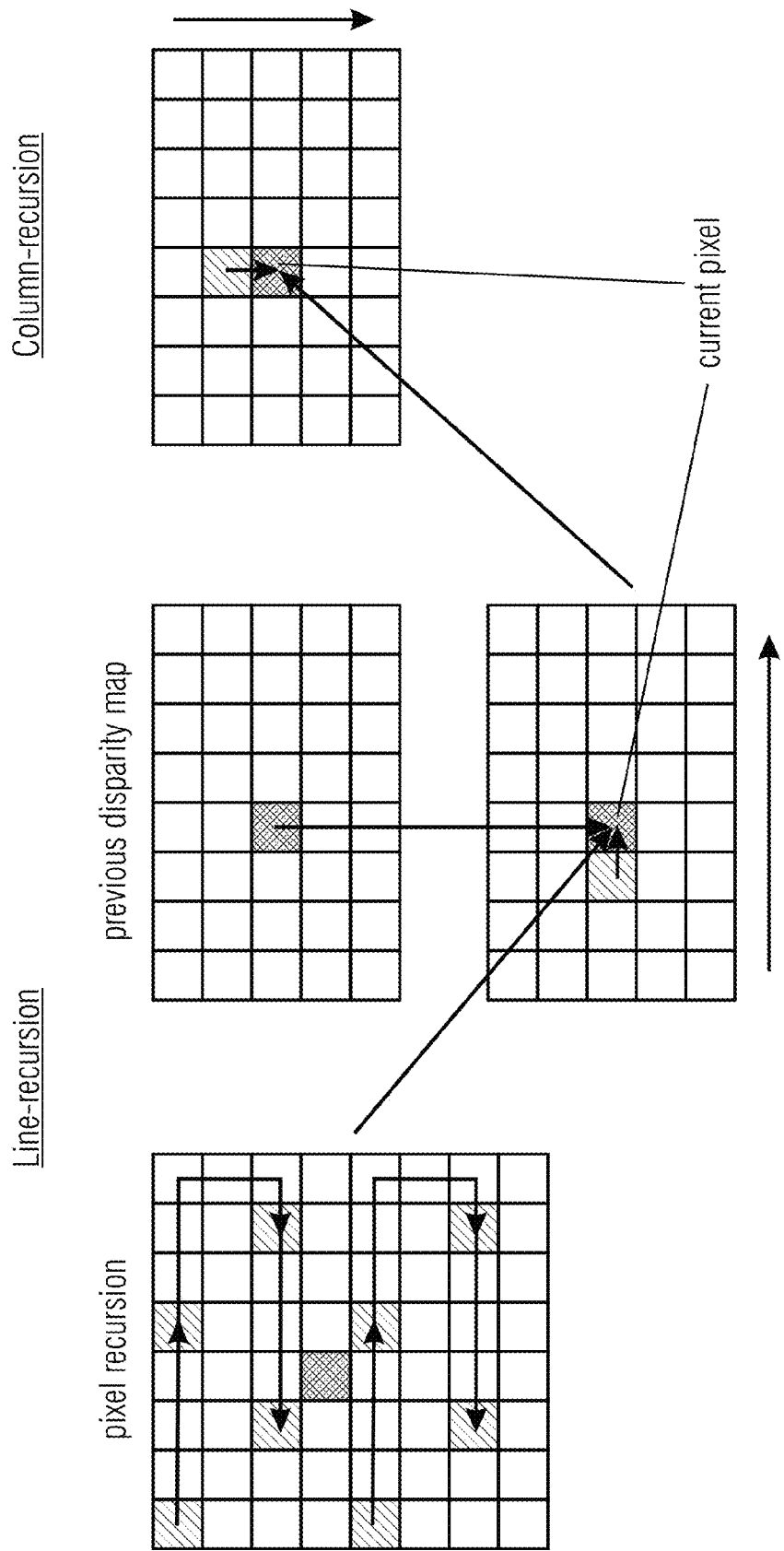
FIG. 4 shows a schematic view illustrating line-wise recursion and column-wise recursion according to an embodiment.

FIG. 4 illustrates the concept of line-wise and column-wise recursion. The final disparity is calculated in a two-step approach. First, a line-wise recursion is performed. In this step three disparity candidates are considered for each pixel: the horizontally preceding pixel's disparity, the disparity of the same pixel in the previous frame and the resulting disparity of the pixel recursion. The initial disparity estimate for the pixel recursion is the best candidate of the first two candidates (the horizontally preceding pixel's disparity and the disparity of the same pixel in the previous frame). The direction of the line-wise recursion is switched from left-to-right to right-to-left for each consecutive line. The second step is the column-wise recursion. Here, only two candidate disparities are considered: the resulting disparity of the preceding line-wise recursion and the vertically preceding pixel's disparity. Analogously to the line-wise recursion, the direction is switched from top-to-bottom to bottom-to-top on a column-wise basis. The resulting disparity maps may still have false disparities, especially in occluded regions. To detect and remove them, a basic post-processing as described below, is advantageous.

Figure 5:
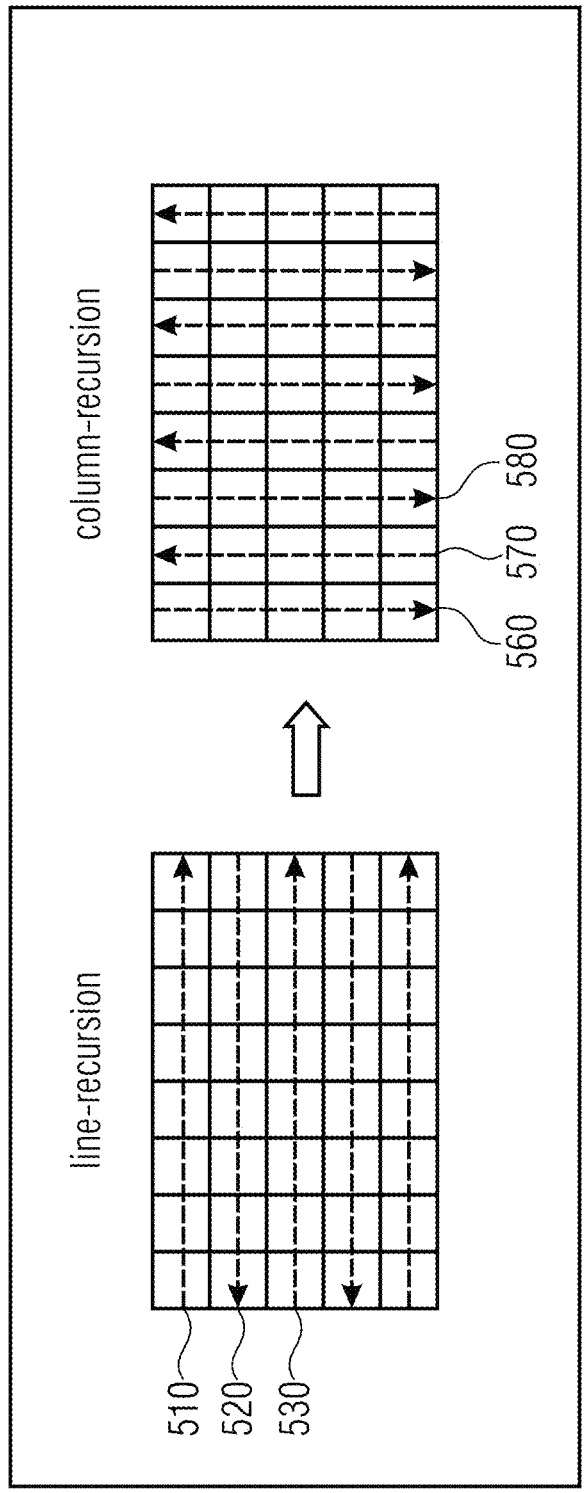
FIG. 5 illustrates left-right disparity estimation according to an embodiment.

FIG. 5 illustrates the switching of the direction of line-wise recursion and column-wise recursion according to a left-right disparity estimation. In the line recursion, the first line 510 is processed from left to right. The second line 520 is processed from right to left. The third line 530 is processed from left to right, etc. Moreover, FIG. 5 illustrates the switching of the direction of column-wise recursion. The first column 560 is processed from top to bottom, the second column 570 is processed from bottom to top, the third column 580 is processed from top to bottom, etc.

Figure 6:
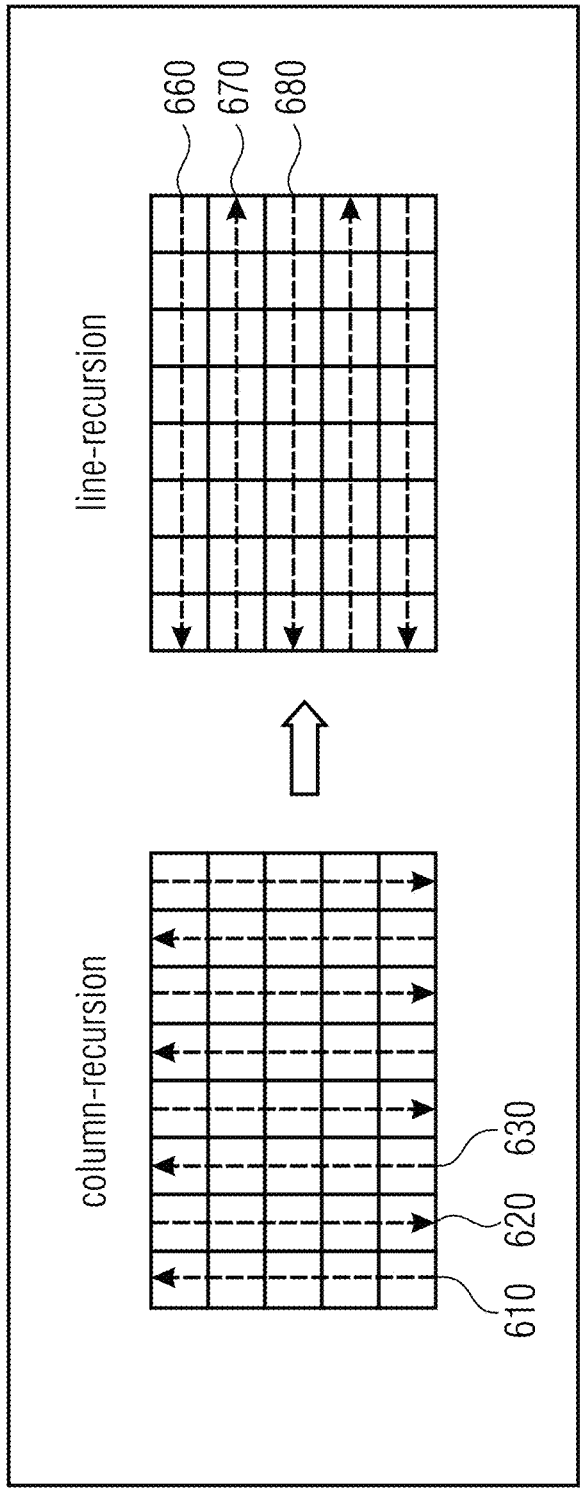
FIG. 6 depicts right-left disparity estimation according to an embodiment.

FIG. 6 illustrates right-left disparity estimation, which starts with column recursion first and conducts line-recursion in a second step. FIG. 6 illustrates the switching of the direction of column-wise recursion. The first column 610 is processed from bottom to top, the second column 620 is processed from top to bottom, the third column 630 is processed from bottom to top, etc. In the line recursion, the first line 660 is processed from right to left. The second line 670 is processed from left to right. The third line 680 is processed from right to left, etc.

Figure 7:
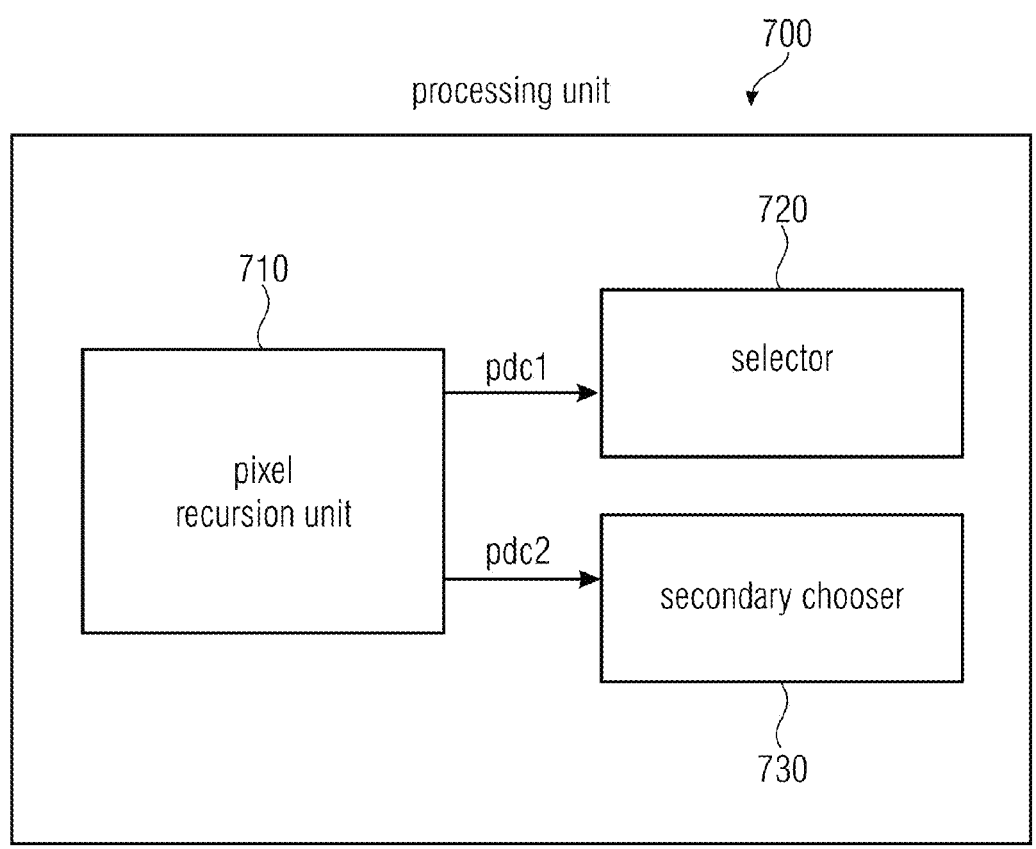
FIG. 7 illustrates a processing unit according to an embodiment comprising a pixel recursion unit, a selector and a secondary chooser.

FIG. 7 illustrates a processing unit 700 according to an embodiment comprising a pixel recursion unit 710, a selector 720 and a secondary chooser 730. The pixel recursion unit is adapted to provide pixel recursion disparity candidates for a considered pixel to a selector 720 or a secondary chooser 730.

According to an embodiment, when conducting left-right disparity estimation, the selector 720 of each processing unit 700 of the apparatus for estimating a disparity map conducts the line-recursion, while the secondary chooser conducts the column-recursion.

According to another embodiment, when conducting right-left disparity estimation, the selector 720 of each processing unit 700 of the apparatus for estimating a disparity map conducts the column-recursion, while the secondary chooser conducts the line-recursion.

Selection of disparity candidates is now explained in more detail. According to an embodiment, the selector of a processing unit may subsequently visit subsequent pixels in a particular line of the first and the second image. For each pixel in the line, a disparity value is selected as selected disparity value. The selected disparity value may, for example, be selected from a group of three disparity values. The first value may be a pixel recursion disparity candidate that is determined by conducting a pixel recursion regarding the considered pixels. The second candidate may be the horizontally preceding pixel's disparity. The third disparity candidate may be the disparity of the same pixel in the previous disparity map. The selector of the processing unit may select the candidate from the candidate group or the disparity candidate which provides the best overall result. To determine which candidate produces the best overall result, the selector of the processing unit employs a quality measure. Such a quality measure may, for example, be a normalized cross-correlation (NCC), a sum of absolute differences (SAD) or a sum of squared differences (SSD).

For example, if a normalized cross-correlation is employed as a quality measure, at first, a block of, e.g., 8×8 pixels, in the neighborhood of the considered pixel (x,y) in the first image is specified. Furthermore, a corresponding block of, e.g. 8×8 pixels in the neighborhood of the corresponding pixel (x+d, y) of the second image is determined. Here, d specifies the disparity value of the candidate that is examined. It should be noted that other block sizes are also possible, for example, 4×4 pixels, 16×16 pixels, 4×8 pixels, 15×20 pixels, etc.

Then, an average intensity value $\bar{I}_L$ for the intensities in the specified block in the first picture is calculated, e.g., according to the formula:

$$\bar{I}_L = \frac{1}{(2n)^2} \sum_{i=-n+1}^{n} \sum_{j=-n+1}^{n} (I_L(x+i, y+j)) \quad (4)$$

wherein $I_L(a, b)$ indicates the intensity value of pixel (a, b) in the first (left) image L.

Similarly, an average intensity value $\bar{I}_R$ for the intensity values of the block in the second picture is calculated, e.g. according to the formula:

$$\bar{I}_R = \frac{1}{(2n)^2} \sum_{i=-n+1}^{n} \sum_{j=-n+1}^{n} (I_R(x+d+i, y+j)) \quad (5)$$

wherein $I_R(a, b)$ indicates the intensity value of pixel (a, b) in the second (right) image R.

Then, the normalized cross-correlation (NCC) may be calculated, e.g. according to the formula:

$$NCC(d) = \frac{\sum_{i=-n+1}^{n} \sum_{j=-n+1}^{n} (I_L(x+i, y+j) - \bar{I}_L)(I_R(x+d+i, y+j) - \bar{I}_R)}{\sqrt{\sum_{i=-n+1}^{n} \sum_{j=-n+1}^{n} (I_L(x+i, y+j) - \bar{I}_L)^2 \cdot \sum_{i=-n+1}^{n} \sum_{j=-n+1}^{n} (I_R(x+d+i, y+j) - \bar{I}_R)^2}} \quad (6)$$

The disparity candidate is optimal that has the maximum cross-correlation among the disparity candidates considered.

If the sum of absolute differences (SAD) is employed as a quality measure, the following formula may be applied:

$$SAD(d) = \sum_{i=-n+1}^{n} \sum_{j=-n+1}^{n} |I_L(x+i, y+j) - I_R(x+d+i, y+j)| \quad (7)$$

The disparity candidate is optimal that has the smallest sum of absolute differences among the disparity candidates considered.

If the sum of squared differences (SSD) is employed as a quality measure, the following formula may be applied:

$$SSD(d) = \sum_{i=-n+1}^{n} \sum_{j=-n+1}^{n} (I_L(x+i, y+j) - I_R(x+d+i, y+j))^2 \quad (8)$$

The disparity candidate is optimal that has the smallest sum of squared differences as a quality measure among the disparity candidates considered.

The selector of a processing unit will choose the disparity candidate that is optimal among the disparity candidates considered. The described concepts of conducting a block comparison by employing a quality measure may be equally applicable, when a selector selects a selected disparity candidate from a candidate group, when a secondary chooser chooses at least one of the disparity map values of the disparity map from a secondary group and when a pixel recursion unit determines a pixel recursion disparity candidate from a plurality of disparity update values.

According to an embodiment, a selector of a processing unit can determine a selected disparity value for each pixel of a line or a column of a disparity map. The disparity values of each line of the disparity map (see, for example, lines 510, 520, 530 in FIG. 5) are determined independently from all other lines of the disparity map. While the second and the following disparity values in a line may be selected from a candidate group comprising the pixel recursion disparity candidate determined by the pixel recursion unit, the disparity of the same pixel in the previous frame and the horizontally preceding pixel disparity; for the first disparity value in a line, the disparity value may be determined based on the pixel disparity candidate resulting from the pixel recursion and the disparity of the same pixel in the previous frame, only. By this, the disparity values in each line of the disparity map can be determined independently from the pixel values of all other lines of the disparity map. Thus, line-wise recursion is suitable for parallelization. For example, a first selector of a first processing unit may determine the pixel values of a first line of the disparity map, while a second different selector of a second different processing unit is determining the disparity values of a second different line of the disparity map. By this, two or more processors may be employed. The described concepts for parallelization are analogously applicable, when column-recursion is conducted by selectors, which is also suitable for parallelization for the same reasons.

In embodiments, a secondary chooser may determine for each column of the disparity map the disparity map values of the disparity map. The secondary chooser chooses either the pixel disparity value resulting from the pixel recursion or the vertically preceding pixel disparity as a pixel disparity value of the disparity map. Again, a quality measure may be employed, which is, for example, a normalized cross-correlation, a sum of absolute differences or a sum of squared differences. The quality measure may be applied as described for the line-wise recursion. E.g., the normalized cross-correlation, the sum of absolute differences or the sum of squared differences may be applied on a block of neighboring pixels of the considered pixel (x,y) of the first image and a block of corresponding neighboring pixels of a corresponding pixel (x+d, y) of the second image. The candidate with the best overall result is chosen, e.g., the candidate that has the greatest cross-correlation value, or the smallest sum of absolute differences, or the smallest sum of squared differences. Column-wise recursion conducted by the secondary chooser is also suitable for parallelization. For example, a first secondary chooser of a first processing unit may determine the pixel disparity values of a first column of the disparity map, while a different secondary chooser of a different second processing unit may determine all pixel disparity values of a second, different column of the disparity map. Two or more processors may be employed for column-wise recursion. The described concepts for parallelization are analogously applicable, when line-recursion is conducted by secondary choosers, which is also suitable for parallelization for the same reasons.

In another embodiment, a temporal hybrid recursive matcher (T-HRM) is provided. The temporal hybrid recursive matcher (T-HRM) is a further variation of the HRM and L-HRM. It allows for even more parallelization than the line-wise hybrid recursive matcher (L-HRM). Each pixel's disparity can be estimated independently from all other pixel disparities. Like the L-HRM, the T-HRM comprises two essential parts: the pixel recursion which is identical to the one used for the L-HRM described before and a disparity propagation step, where the disparities of neighboring pixels are propagated to the current one.

Figure 8:
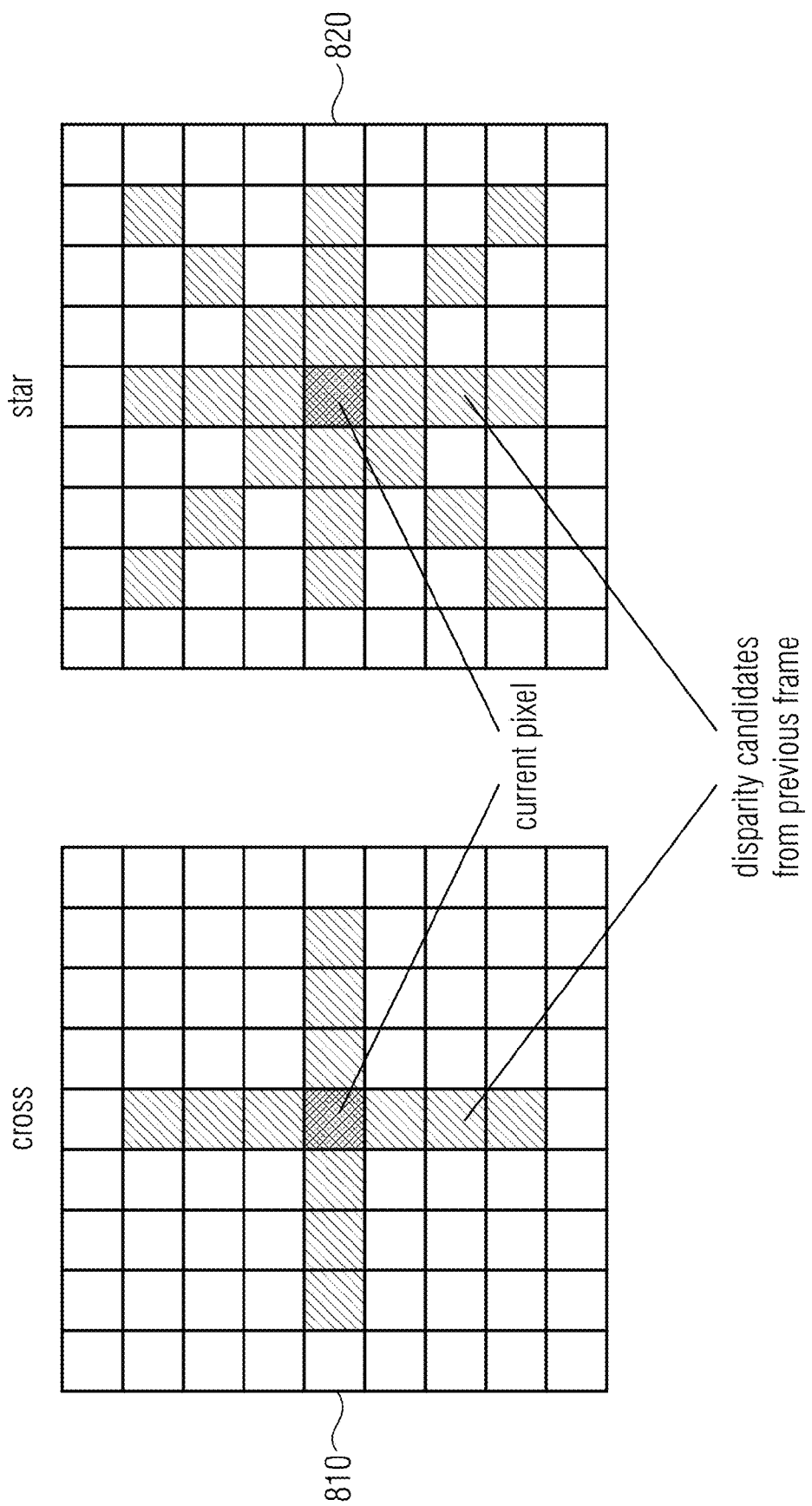
FIG. 8 illustrates a disparity propagation scheme of the temporal hybrid recursive matcher according to an embodiment.

FIG. 8 illustrates a disparity propagation scheme of the temporal hybrid recursive matcher (T-HRM). In order to achieve pixel-wise parallelization, the disparity propagation step only considers disparities from the previous frame. So, each pixel's estimation step is only dependent on the disparities calculated in the previous frame. To ensure a proper propagation, more disparity candidates have to be considered than in case of the line-recursion of the L-HRM. As a compromise between execution time and propagation range, two propagation schemes are proposed: the star 820 (FIG. 8, right side) and the cross 810 (FIG. 8, left side). The cross 810 only considers disparities of pixels on a vertical and horizontal line with the current pixel at the center. The number of pixels considered in each direction may depend on how much the underlying images change from frame to frame. A search range of 16 to 32 pixels in each direction has proven to be a good compromise between execution speed and quality. The star pattern 820 also considers pixels on the diagonals. Like the L-HRM, all disparity candidates including the candidate disparity of the pixel recursion are compared using block matching with a normalized cross-correlation as measure and the best match is chosen as resulting disparity.

The disparity map resulting from the L-HRM or T-HRM may still comprise wrong disparities from occluded regions or other bad matches. A basic post-processing may be applied to detect false disparities and remove them from the final disparity map.

An efficient method to detect wrong disparities is the left-right consistency check. Two disparity maps are estimated independently: one from the left to the right image and the other from the right to the left one. In case of the L-HRM, an additional degree of independence is achieved by estimating one disparity map with a line-wise recursion first and a column-wise recursion second as described above. For, the second disparity map, a column-wise recursion may be conducted first, and a line-wise recursion may be conducted second.

Figure 9:
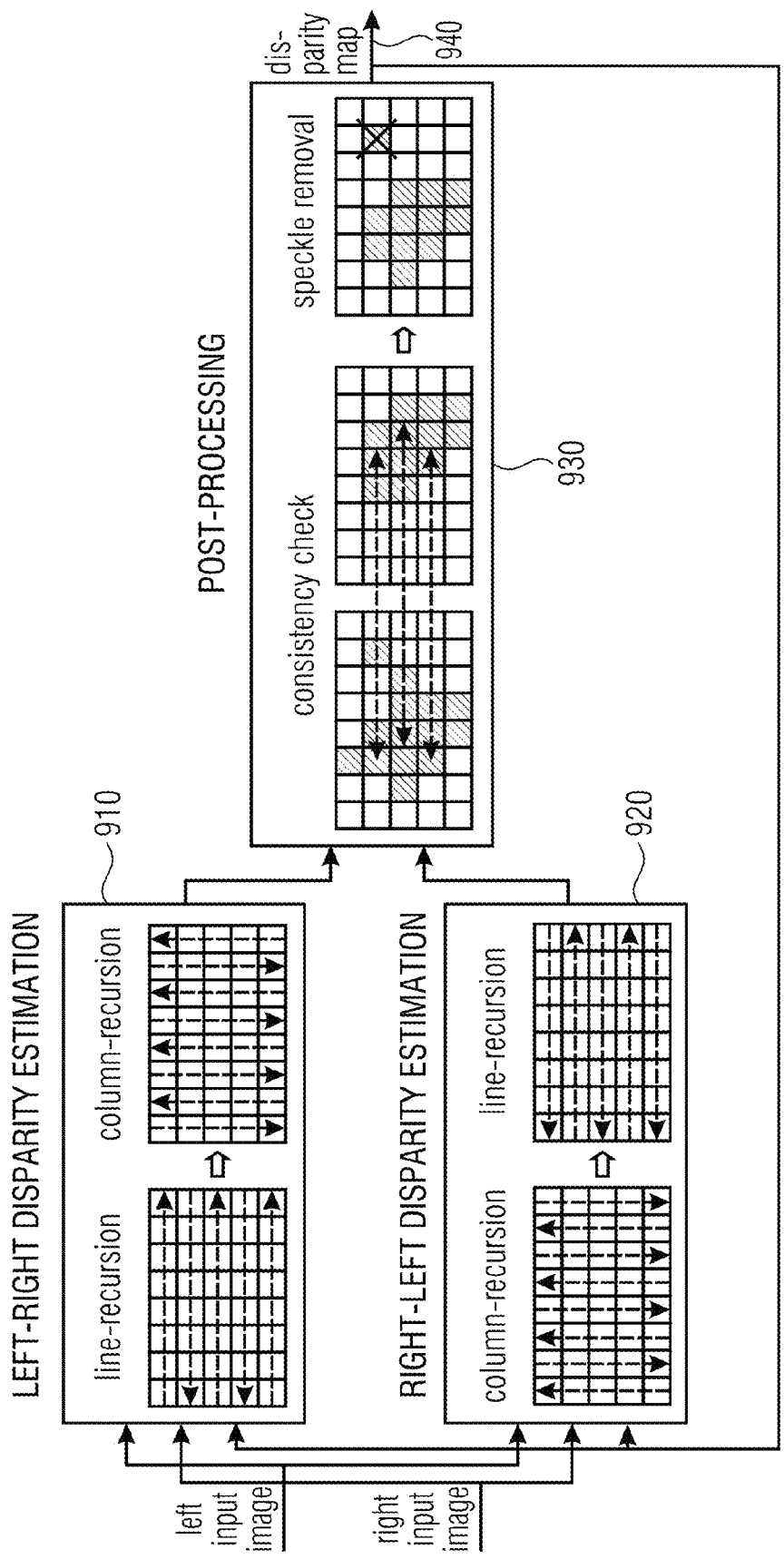
FIG. 9 depicts a consistency check according to an embodiment, wherein a left-right disparity map and a right-left disparity map is determined.

FIG. 9 illustrates a corresponding scheme, wherein a left-right disparity map is determined by a left-right disparity estimation 910 and a right-left disparity map is determined by a right-left disparity estimation 920. Which disparity map is estimated, lines-first or columns-first may be switched on a frame-by-frame basis. Since both disparity maps are based on the same input stereo image pair, they can be mapped to each other on a per-pixel basis. If the disparities in the two disparity maps do not match on a per pixel basis or differ by an amount greater than the consistency threshold, they may be removed from the resulting disparity map.

In a post-processing step 930, small speckles may be removed from the disparity map. These are most likely due to wrong disparity estimates especially in occluded regions which, by coincidence, were not detected by the consistency check.

Figure 10:
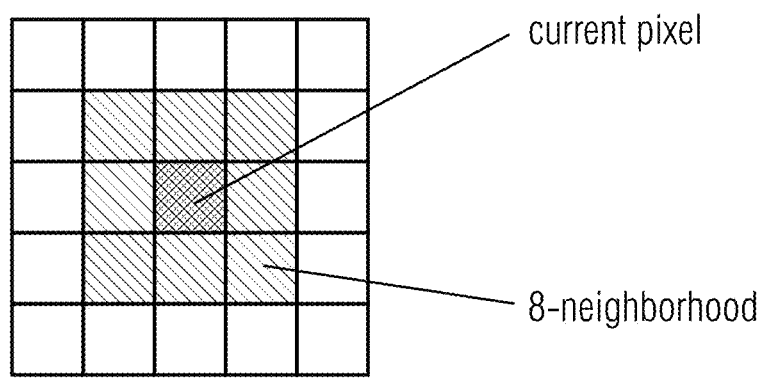
FIG. 10 shows an 8-neighborhood of a current pixel.

To remove speckles, a simple median-like filter is applied on the consistency map. All neighborhood pixels are checked, if they were marked invalid during the consistency check. Such an 8-neighborhood of a current pixel is illustrated by FIG. 10. If more than a certain number of neighboring pixels are invalid, the current pixel's disparity is also invalidated. Four or more invalid disparities in the 8-neighborhood may be a good threshold for invalidating the pixel in question. The resulting disparity map is the final output 940 (see FIG. 9) of the apparatus for generating a post-processed disparity map. This finally output disparity map is also used as temporally preceding disparity map for the next frame.

Figure 11:
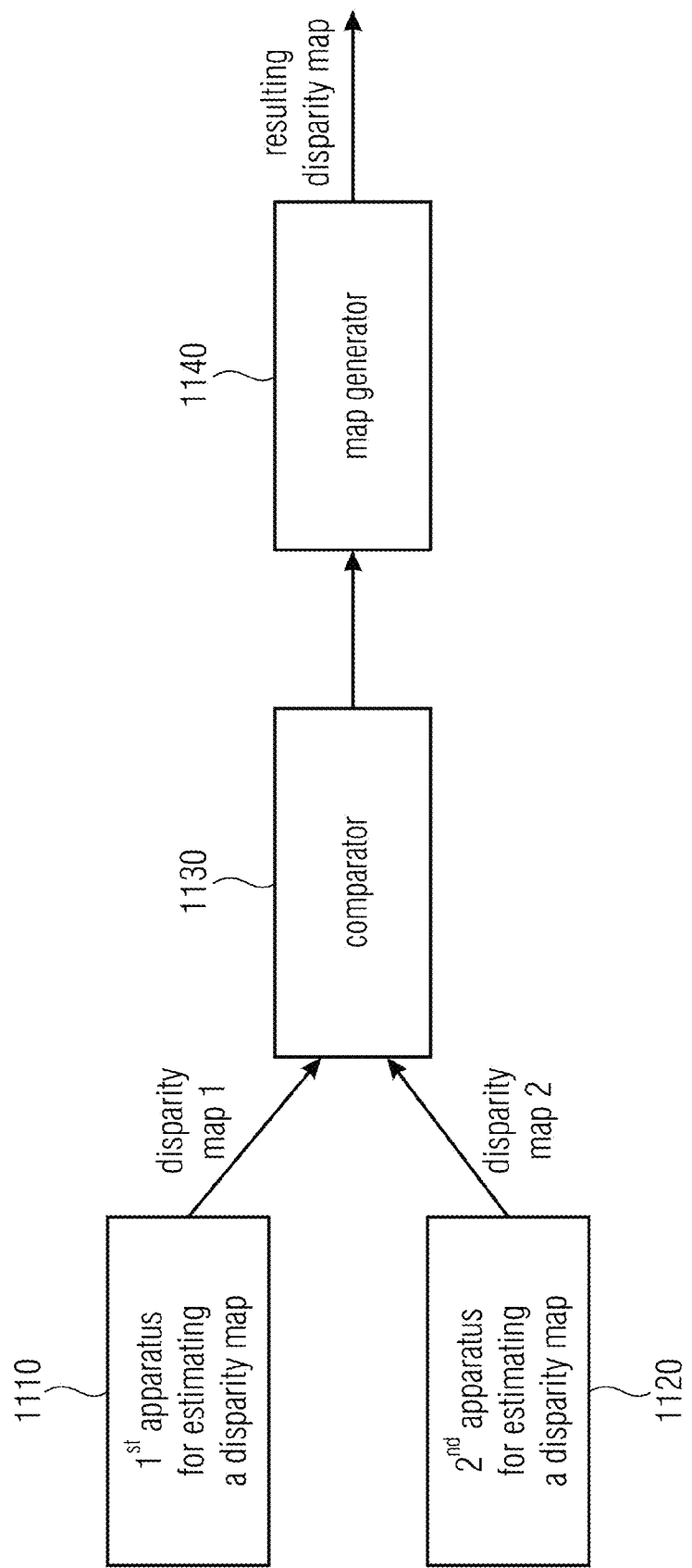
FIG. 11 illustrates an apparatus for generating a post-processed disparity map according to an embodiment.

FIG. 11 illustrates an apparatus for generating a post-processed disparity map according to an embodiment. The apparatus for generating a post-processed disparity map comprises a first apparatus 1110 for estimating a disparity map comprising a plurality of disparity map values, based on at least two images, according to one of the above-described embodiments for providing a first disparity map. The apparatus for generating a post-processed disparity map furthermore comprises a second apparatus 1120 for estimating a disparity map comprising a plurality of disparity map values, based on the at least two images, according to one of the above-described embodiments for providing a second disparity map.

Moreover, the apparatus for generating a post-processed disparity map furthermore comprises a comparator 1130 for comparing the first disparity map and the second disparity map, and for identifying invalid disparity pixels, being located at the same pixel position in the first and the second disparity map and having different disparity values or disparity values with a difference greater than a predefined threshold value.

Furthermore, the apparatus for generating a post-processed disparity map comprises a map generator 1140 for generating a resulting disparity map comprising resulting map values. The map generator may be configured to generate the resulting disparity map from the first and the second disparity map, by generating for a pixel position of the resulting disparity map a resulting map value based on at least a pixel at the pixel position in the first or the second disparity map, when the pixel at the pixel position has not been identified as invalid disparity pixel by the comparator. In a further embodiment the map generator 1140 may be configured to generate a mean value of a plurality of resulting map values of the resulting disparity map and to use the generated mean value as a resulting disparity map value for a pixel at a position in the resulting disparity map that has been identified as an invalid disparity pixel by the comparator.

In the following, a performance evaluation is presented. A short evaluation of the run-time and quality of the proposed disparity estimators L-HRM and T-HRM is conducted. The run-times were measure on a Dual-processor X5680 system running RedHat Linux 64 bit. As can be seen in Table 1 and Table 2, both estimators are real-time capable for an image resolution of at least 960×540 pixels. Given enough cores they will also be capable of processing 1920×1080 images in real-time. Though the T-HRM seems to perform not as good as the L-HRM, due to its massive parallelism it scales better with a very high number of cores as available for examples on a graphics card and similar devices.

In Table 1, execution time of L-HRM depending on image size and number of available cores is illustrated.

TABLE 1

| Cores | 1 | 2 | 4 | 8 | 12 |
|---|---|---|---|---|---|
| 1920 × 1080 | 898 ms | 462 ms | 238 ms | 124 ms | 91 ms |
| 960 × 540 | 201 ms | 104 ms | 53 ms | 28 ms | 20 ms |
| 480 × 270 | 54 ms | 29 ms | 15 ms | 8 ms | 6 ms |

In Table 2, execution time of T-HRM depending on image size and number of available cores is illustrated.

TABLE 2

| Cores | 1 | 2 | 4 | 8 | 12 |
|---|---|---|---|---|---|
| 1920 × 1080 | 2025 ms | 1195 ms | 615 ms | 328 ms | 226 ms |
| 960 × 540 | 382 ms | 223 ms | 115 ms | 64 ms | 36 ms |
| 480 × 270 | 112 ms | 68 ms | 36 ms | 20 ms | 11 ms |

Figure 12:
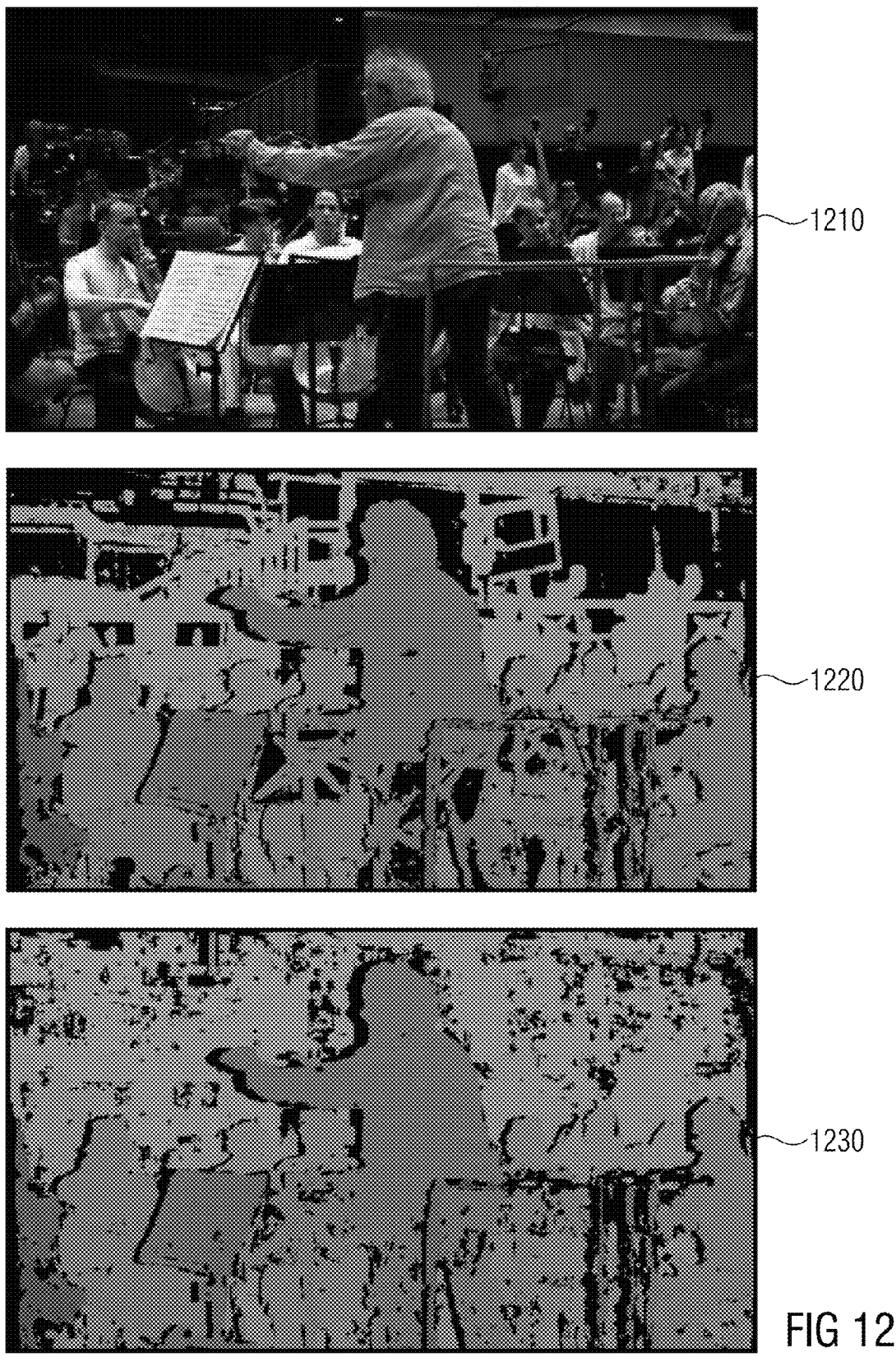
FIG. 12 illustrates a left image of a stereo image pair and visualizes a disparity map estimated by employing a temporal hybrid recursive matcher and a disparity map estimated by employing a line-wise hybrid recursive matcher.

FIG. 12 illustrates visualizations of sample disparity maps of the L-HRM and T-HRM to give an impression of the expected quality of the disparity maps. The left image of FIG. 12, depicts a left image of a stereo image pair. The center image of FIG. 12 is a graphical visualization of a disparity map estimated by T-HRM. The right side of FIG. 12 visualizes a disparity map as estimated by L-HRM.

While the concepts of the above-described embodiments have been explained with reference to a disparity map relating to a horizontal disparity, the concepts of the present invention are equally applicable to disparity maps that comprises disparity values that also or alternatively relate to vertical disparity.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

Atzpadin, N., Kauff, P., Schreer, O. (2004). Stereo Analysis by Hybrid Recursive Matching for Real-Time Immersive Video Conferencing. IEEE Trans. on Circuits and Systems for Video Technology, Special Issue on Immersive Telecommunications, Vol. 14, No. 4, 321-334.

De Haan, G., Biezen, P. W. A. C., Huijgen, H., Ojo, O. A. (1993). True-Motion Estimation with 3-D Recursive Search Block Matching. IEEE Trans. on Circuits and Systems for Video Technology, Vol. 3, No. 5, 368-379.

Kauff, P., Schreer, O., Ohm, J.-R. (2001). An Universal Algorithm for Real-Time Estimation of Dense Displacement Vector Fields. Proc. of Int. Conf. on Media Futures, Florence, May 2011.

Atzpadin, N., Karl, M., Kauff, P., Schreer, O. (2002), European Patent Application, Publication Number EP 1 229 741 A2.

The invention claimed is:

1. An apparatus for determining a disparity map comprising a plurality of disparity map values, based on at least two images, wherein the apparatus comprises:
at least two processing units, wherein each of the at least two processing units comprises:
a pixel recursion unit for determining a disparity value as a pixel recursion disparity candidate based on a plurality of pixel values of the at least two images, and
a selector, configured to select a selected disparity candidate to determine at least one of the disparity map values of the disparity map, wherein the selector is adapted to select the selected disparity candidate from a candidate group assigned to the selector, wherein the candidate group assigned to the selector comprises the pixel recursion disparity candidate, a second disparity candidate and a third disparity candidate, and wherein the selector is adapted to select the selected disparity candidate independently from a different selector of a different processing unit of the at least two processing units.

2. An apparatus according to claim 1, wherein the candidate group assigned to the selector of the processing unit does not comprise a disparity candidate provided by a different selector of a different processing unit of the at least two processing units.

3. An apparatus according to claim 1, wherein a first selector of a first processing unit of the at least two processing units is configured to select a first selected disparity candidate in parallel to a different second selector selecting a different second disparity candidate, wherein the different second selector is a selector of a different second processing unit of the at least two processing units.

4. An apparatus according to claim 1, wherein the pixel recursion unit of each of the at least two processing units is adapted to determine the pixel recursion disparity candidate by subsequently determining a plurality of disparity update values,
wherein the pixel recursion unit of each of the at least two processing units is adapted to determine at least one of the plurality of disparity update values based on an intensity difference between a pixel of a first image and a pixel of a second image of the at least two images.

5. An apparatus according to claim 4, wherein the pixel recursion unit of each of the at least two processing units is adapted to determine at least one of the plurality of pixel disparity update values by applying the formula:

$$d_{n+1}(x, y) = d_n - \Delta I(x, y, d_n) \cdot \delta, \text{ and}$$

wherein $\Delta I(x, y, d_n) = I_L(x, y) - I_R(x + d_n, y)$, and wherein $\delta = \dfrac{I_L(x+1, y) - I_L(x, y)}{\|I_L(x+1, y) - I_L(x, y)\|^2}$ or $\delta = \dfrac{1}{I_L(x+1, y) - I_L(x, y)}$, and
wherein $d_n$ is a disparity value, wherein $I_L(x,y)$ is a first intensity value of pixel (x,y) of a first image, wherein $I_R(x+d_n,y)$ is a second intensity value of pixel $(x+d_n,y)$ of a second image, and wherein $I_L(x+1,y)$ is a third intensity value of pixel (x+1,y) of the first image.

6. An apparatus according to claim 1, wherein the pixel recursion unit of each of the at least two processing units is adapted to determine the pixel recursion disparity candidate by subsequently determining a plurality of disparity update values,
wherein the pixel recursion unit of each of the at least two processing units is adapted to generate the plurality of disparity update values by determining one or more random numbers and by employing the one or more random numbers for generating the plurality of disparity update values.

7. An apparatus according to claim 4, wherein the pixel recursion unit of at least one of the at least two processing units comprises a first pixel recursion subunit and a second pixel recursion subunit,
wherein the first pixel recursion subunit determines a first group of disparity update values of the plurality of disparity update values by conducting a first plurality of iteration steps,
and wherein the second pixel recursion subunit determines a second group of different disparity update values of the plurality of disparity update values by conducting a second different group of iteration steps in parallel to the first pixel recursion subunit determining the first group of disparity update values.

8. An apparatus according to claim 4, wherein the pixel recursion unit of each of the at least two processing units is configured to conduct for each of the plurality of disparity update values a block comparison of a first block of pixel intensity values of the first image with a second block of pixel intensity values of the second image by employing a quality measure, to determine the pixel recursion disparity candidate.

9. An apparatus according to claim 1, wherein the selector of each of the at least two processing units is configured to select a selected disparity candidate from the candidate group assigned to the selector, wherein the candidate group assigned to the selector comprises the pixel recursion disparity candidate, a disparity of a horizontally or vertically preceding pixel and a disparity of a pixel of a previous frame.

10. An apparatus according to claim 1,
wherein the selector of each of the at least two processing units is configured to select a selected disparity candidate for each pixel of at least one line of the disparity map, or
wherein the selector of each of the at least two processing units is configured to select a selected disparity candidate for each pixel of at least one column of the disparity map.

11. An apparatus according to claim 9, wherein a first selector of a first processing unit of the at least two processing units is configured to determine a first selected disparity candidate in parallel to a different second selector determining a different second selected disparity candidate, wherein the different second selector is a selector of a different second processing unit of the at least two processing units.

12. An apparatus according to claim 9, wherein the selector of each of the at least two processing units is configured to conduct a block comparison of a first block of pixel intensity values of the first image with a second block of pixel intensity values of the second image by employing a quality measure, to determine the selected disparity candidate.

13. An apparatus according to claim 9, wherein each of the at least two processing units furthermore comprises a secondary chooser, and wherein the secondary chooser of each of the at least two processing is configured to choose at least one of the disparity map values of the disparity map from a secondary group of at least two values, the secondary group comprising one of the selected disparity candidates selected by the selectors of the at least two processing units as a first value and a vertically or horizontally preceding pixel's disparity as a second value.

14. An apparatus according to claim 13,
wherein the secondary chooser of each of the at least two processing units is configured to determine the pixel disparity value for each pixel of at least one column of the disparity map, or
wherein the secondary chooser of each of the at least two processing units is configured to determine the pixel disparity value for each pixel of at least one line of the disparity map.

15. An apparatus according to claim 13, wherein a first secondary chooser of a first processing unit of the at least two processing units is configured to determine a first disparity map value in parallel to a different second secondary chooser determining a different second selected disparity map value, wherein the different second secondary chooser is a secondary chooser of a different second processing unit of the at least two processing units.

16. An apparatus according to claim 13,
wherein the selector of each of the at least two processing units is configured to select a selected disparity candidate for each pixel of at least one line of the disparity map, and
wherein the secondary chooser of each of the at least two processing units is configured to determine the pixel disparity value for each pixel of at least one column of the disparity map.

17. An apparatus according to claim 13,
wherein the selector of each of the at least two processing units is configured to select a selected disparity candidate for each pixel of at least one column of an image, and
wherein the secondary chooser of each of the at least two processing units is configured to determine the pixel disparity value for each pixel of at least one line of the disparity map.

18. An apparatus according to claim 1, wherein the selector of each of the at least two processing units is adapted to select a selected disparity candidate from the candidate group assigned to the selector, wherein the candidate group assigned to the selector comprises the pixel recursion disparity candidate and disparities of at least four previous pixels of the previous frame.

19. An apparatus according to claim 18, wherein the at least four previous pixels of the previous frame are arranged as a cross in the previous frame.

20. An apparatus according to claim 18, wherein the at least four previous pixels of the previous frame are arranged as a star in the previous frame.

21. An apparatus according to claim 18, wherein a first selector of a first processing unit of the at least two processing units is configured to determine a first selected disparity candidate in parallel to a different second selector determining a different second selected disparity candidate, wherein the different second selector is a selector of a different second processing unit of the at least two processing units.

22. An apparatus according to claim 18, wherein the selector of each of the at least two processing units is configured to conduct block comparisons of a first block of pixel intensity values of the first image with a second block of pixel intensity values of the second image, by employing a quality measure, to determine the pixel recursion disparity candidate.

23. An apparatus for generating a post-processed disparity map, comprising:
first and second apparatuses for estimating a disparity map comprising a plurality of disparity map values, based on at least two images, according to claim 1, for providing a first disparity map and a second disparity map, respectively,
a comparator for comparing the first disparity map and the second disparity map, and for identifying invalid disparity pixels, being located at the same pixel position in the first and the second disparity map and comprising different disparity values or disparity values with a difference greater than a predefined threshold value, and
a map generator for generating a resulting disparity map comprising resulting map values, wherein the map generator is configured to generate the resulting disparity map from the first and the second disparity map, by generating for a pixel position of the resulting disparity map a resulting map value based on at least a pixel at the pixel position in the first or the second disparity map, when the pixel at the pixel position has not been identified as invalid disparity pixel by the comparator.

24. An apparatus for generating a post-processed disparity map according to claim 23, wherein the map generator is configured to generate a mean value of a plurality of resulting map values of the resulting disparity map and to use the generated mean value as a resulting disparity map value for a pixel at a position in the resulting disparity map that has been identified as an invalid disparity pixel by the comparator.

25. A method for estimating a disparity map comprising a plurality of disparity map values, based on at least two images, comprising:
determining a first disparity value as a first pixel recursion disparity candidate based on a first plurality of pixel values of the least two images,
selecting a first selected disparity candidate to determine at least one of the disparity map values of the disparity map, wherein the selected disparity candidate is selected from a first candidate group comprising the first pixel recursion disparity candidate and at least two further disparity candidates,
determining a second disparity value as a second pixel recursion disparity candidate based on a second plurality of pixel values of the least two images, and
selecting a second selected disparity candidate to determine at least one of the disparity map values of the disparity map, wherein the second selected disparity candidate is selected from a second candidate group comprising the second pixel recursion disparity candidate and at least two further disparity candidates, wherein the first selected disparity candidate is selected independently from the selection of the second selected disparity candidate, and wherein the second selected disparity candidate is selected independently from the selection of the first selected disparity candidate.

26. A method according to claim 25, wherein the first selected disparity candidate is selected in parallel to the selection of the second selected disparity candidate.

27. A non-transitory computer readable medium including a computer program for implementing a method according to claim 25, when the computer program is executed by a computer or processor.

* * * * *